United States Patent
Jolk et al.

(10) Patent No.: US 9,592,533 B2
(45) Date of Patent: Mar. 14, 2017

(54) PROCESS FOR TIN COATING A METALLIC SUBSTRATE, PROCESS FOR HARDENING A TIN LAYER AND WIRE HAVING A TIN COATING

(71) Applicant: Feindrahtwerk Adolf Edelhoff GmbH & Co. KG, Iserlohn (DE)

(72) Inventors: Ingo Jolk, Ansberg (DE); Mathias Fiolka, Hemer (DE); Gerhard Buerstner, Schwerte (DE); Joerg Liedemann, Iserlohn (DE)

(73) Assignee: Feindrahtwerk Adolf Edelhoff GmbH & Co. KG, Iserlohn (DE)

( * ) Notice: Subject to any disclaimer, the term of this patent is extended or adjusted under 35 U.S.C. 154(b) by 461 days.

(21) Appl. No.: 14/017,966

(22) Filed: Sep. 4, 2013

(65) Prior Publication Data

US 2014/0079957 A1    Mar. 20, 2014

(51) Int. Cl.

| | |
|---|---|
| *B05D 3/02* | (2006.01) |
| *B05D 7/20* | (2006.01) |
| *B32B 15/01* | (2006.01) |
| *B32B 15/16* | (2006.01) |
| *C25D 5/50* | (2006.01) |
| *C23C 28/02* | (2006.01) |
| *C21D 9/52* | (2006.01) |
| *C25D 7/06* | (2006.01) |
| *C23C 18/16* | (2006.01) |
| *C23C 10/30* | (2006.01) |
| *C21D 1/26* | (2006.01) |

(52) U.S. Cl.
CPC ............. *B05D 7/20* (2013.01); *B05D 3/0254* (2013.01); *B32B 15/01* (2013.01); *B32B 15/16* (2013.01); *C21D 9/525* (2013.01); *C23C 10/30* (2013.01); *C23C 18/1651* (2013.01); *C23C 18/1653* (2013.01); *C23C 18/1692* (2013.01); *C23C 28/02* (2013.01); *C23C 28/023* (2013.01); *C25D 5/50* (2013.01); *C25D 5/505* (2013.01); *C25D 7/0607* (2013.01); *C21D 1/26* (2013.01); *Y10T 428/12076* (2015.01); *Y10T 428/12708* (2015.01)

(58) Field of Classification Search
CPC ....................................................... C25D 5/505
See application file for complete search history.

(56) References Cited

U.S. PATENT DOCUMENTS

| | | | | |
|---|---|---|---|---|
| 4,999,258 A | * | 3/1991 | Wake ........................ | C25D 5/10 428/632 |
| 5,597,656 A | * | 1/1997 | Carey, II ................ | B32B 15/013 428/646 |

(Continued)

FOREIGN PATENT DOCUMENTS

| | | |
|---|---|---|
| EP | 0 919 644 B1 | 6/1999 |
| JP | 05106018 A | 4/1993 |

*Primary Examiner* — Nathan Empie
(74) *Attorney, Agent, or Firm* — Scully Scott Murphy and Presser

(57) ABSTRACT

The present invention is directed to a process for tin coating a metallic substrate, and a process for hardening a tin layer and wire having a tin coating The invention relates in particular to a process for tin coating a wire. In the process, firstly a tin layer is applied, and a metal layer made of a metal different to tin is applied thereto. Then, the layers are subjected to a diffusion annealing operation.

21 Claims, 1 Drawing Sheet

(56) References Cited

U.S. PATENT DOCUMENTS

2005/0211461 A1* 9/2005 Horikoshi ............... C25D 5/10
                                                    174/117 FF
2008/0308300 A1* 12/2008 Conti ..................... C25D 5/10
                                                    174/250

* cited by examiner

PROCESS FOR TIN COATING A METALLIC SUBSTRATE, PROCESS FOR HARDENING A TIN LAYER AND WIRE HAVING A TIN COATING

BACKGROUND OF THE INVENTION

The invention relates in particular to a process for tin coating a metallic substrate, in particular a wire, for example a profiled wire or a round wire.

DISCUSSION OF THE PRIOR ART

Wires having tin coatings are used, for example, in the electronics industry. The tin coating in this context can serve as a type of corrosion protection for an underlying metallic substrate. Tin coatings are advantageously also used when the wires are to be subjected to soldering processes.

Particularly for effective corrosion protection, it is advantageous that the tin coating is damaged as little as possible by and in machining and processing installations, and in particular the abrasion on the tin coating can be kept as low as possible. To this extent, it is desirable to be able to produce particularly hard and abrasion-resistant tin coatings in particular for wires.

SUMMARY OF THE INVENTION

Proceeding from this, it is an object of the invention to provide a process which makes it possible to produce particularly resistant tin coatings, in particular resistant to mechanical loading, on substrates, in particular wires. Furthermore, the intention is to specify a process which makes it possible to produce harder tin coatings compared to coatings produced from pure tin. Furthermore, the intention is to specify a wire having a correspondingly improved tin coating.

According to the invention, a process for tin coating a metallic substrate is proposed. The metallic substrate can be in particular a wire, for example a profiled or round wire.

The process for tin coating comprises the following steps in succession:
applying a tin layer to the substrate;
applying at least one metal layer made of at least one metal different to tin; and
carrying out a diffusion annealing operation encompassing at least the tin layer and the at least one metal layer.

The tin layer can be deposited chemically or electrochemically, for example. The tin coating can be applied for protecting the substrate against corrosion. Furthermore, the tin coating can be applied for the purpose of better solderability.

The at least one metal layer, which may be for example a layer comprising the metal nickel, cobalt, silver, gold or platinum, can likewise be applied chemically or electrochemically.

After the at least one metal layer has been applied, a diffusion annealing operation is carried out at least for the tin layer and the at least one metal layer. This is intended to mean in particular that at least the tin layer and the at least one metal layer are heat-treated, more precisely annealed, by diffusion annealing.

The diffusion annealing operation is preferably carried out in a continuous pass or in a continuous annealing installation. Alternatively, the metallic substrate, in particular the wire, can also be subjected to the diffusion annealing operation as a batch, i.e. as a whole including the coatings, for example on or as a spool.

It has surprisingly been found that the proposed process makes it possible to produce tin coatings or tin layers which have improved mechanical strengths compared to pure tin coatings or tin layers. In particular, it is possible to produce tin coatings or tin layers which have a greater hardness and/or an improved abrasion resistance compared to pure tin layers. For the tin coatings or tin layers proposed here, it was possible to achieve a hardness of or in the region of 7H, as determined with reference to the method of Wolf Wilburn in accordance with ISO 15184 or DIN EN 13523-4. For conventional, in particular pure, tin layers, hardnesses of only 4H have been measured. This clearly shows that greater hardnesses, in particular surface hardnesses, can be achieved with the tin coating proposed here and the proposed tin layers.

Particularly on account of the higher hardness, during the processing or machining of the metallic substrate, in particular of the wire, the abrasion on the tin coating or tin layer caused, for example, by machining machines can be reduced. With harder tin layers and associated reduced abrasion, a corrosion protection improved overall can be achieved in particular.

Reduced abrasion during the machining and further processing furthermore has the advantage that down times of respective machining and processing machines for cleaning can be reduced.

A further possible advantage of harder tin coatings or tin layers is that, under certain circumstances, the thickness of the applied tin layer can be reduced, which may result in savings of the coating material.

In the process, it is possible in one configuration that the tin layer is applied in a thickness of 1 μm to 20 μm. It is preferable that the tin layer is applied or deposited in a thickness of between 1 μm and 8 μm. Said thickness ranges have proved to be sufficient particularly for corrosion protection purposes. The tin coatings and tin layers can advantageously be used in the thickness ranges indicated as corrosion protection for wires, in particular profiled wires and round wires. The thickness or the diameter of the wires or of the substrate can lie, for example, in the range of between 0.20 mm and 3.0 mm.

As has already been mentioned, the tin layer is preferably deposited on the substrate chemically or electrochemically. One possible procedure for depositing the tin layer, in particular on a wire substrate, can comprise the following substeps, for example:
cleaning the surface of the substrate or of the wire, for example by electrochemical processes, where the cleaning can include in particular degreasing of the surface;
activating the surface, for example by acid treatment; and
applying the tin layer, where an intermediate layer made of nickel can also optionally be applied to the substrate before the tin layer is applied.

As already mentioned, the tin layer and the optional nickel layer can be deposited chemically or electrochemically. After the tin layer has been deposited, and before the metal layer is applied or deposited, it is possible to provide a cleaning step and if appropriate a drying step. The metal layer can then be deposited on the optionally cleaned and dried tin layer, followed by the diffusion annealing, in particular of the layer composite consisting of the tin layer and the metal layer.

In a further configuration of the process, it is provided that the metal layer is applied or deposited in a thickness, in particular in a mean thickness, of 10 nm to 100 nm, preferably in a thickness or mean thickness of 40 nm to 80 nm, in particular 60 nm to 80 nm, in particular 80 nm. Such thicknesses of the metal layer have proved to be suitable and also sufficient for the thicknesses of the tin layer indicated above, in particular for achieving improved hardnesses and abrasion resistances. In particular, the proposed thicknesses are sufficient for the coating resulting after the diffusion annealing operation to have, at least at its surface, an improved and sufficient hardness, in particular for subsequent mechanical loading in machining and processing machines.

According to a further configuration of the process, it can be provided, as already indicated, that an intermediate layer consisting essentially of nickel is applied to the metallic substrate before the tin layer is applied. The nickel layer located between the substrate and the tin layer can be provided in particular for reducing the formation of what are known as whiskers. The wording "consisting essentially of nickel" is intended to mean in particular that the nickel layer can be a nickel layer consisting of nickel and unavoidable impurities.

According to a further configuration of the process, it is provided that the at least one metal of the metal layer is selected from the following group: cobalt, gold, nickel, platinum, silver, iron, rhodium, copper. Particularly with the proposed metals, it is possible to achieve a particularly advantageous hardness and abrasion resistance for the resulting tin coating.

According to a further configuration of the process, it is provided that the diffusion annealing operation is carried out in such a manner that at least the tin layer and the metal layer are heated to a diffusion annealing temperature of between 100° C. and 500° C. The diffusion temperature preferably lies between 200° C. and 400° C. At the indicated diffusion temperatures, advantageous and sufficient hardnesses and surface properties can be achieved. In particular, it is possible to achieve a situation where the metal of the metal layer applied to the tin layer diffuses into the tin layer, as a result of which it is possible to achieve in particular at least a hardening of the resulting tin coating close to the surface.

In particular, it is possible to achieve a situation where the metal of the metal layer, for example in the form of metal particles, is present in the resulting tin coating close to the surface and in a concentration decreasing inwards. This can be advantageous for a relatively high surface hardness. The temperatures and temperature ranges indicated above for the diffusion annealing operation have proved to be particularly advantageous for achieving the described profile of the concentration of the metal in the resulting tin coating.

The wording "inwards" should be understood in particular as "in a direction from the outside inwards", i.e. from the outside towards the substrate. In particular in the case of round wires, the wording "inwards" should be understood as "in the radial direction towards the substrate".

With the concentration gradient achieved by the diffusion annealing operation, it is possible to achieve improved hardnesses in particular in regions close to the surface. If the diffusion annealing operation is carried out in a suitable manner and the concentration of the metal decreases sufficiently quickly, it is possible to achieve a situation where the properties of regions or layers located further inside the resulting tin coating are substantially not or scarcely impaired.

According to a further configuration of the process, at least the tin layer and the metal layer are heated during the diffusion annealing operation for a period of time of between 10 ms and 1200 s. The heating is preferably effected in a timeframe of between 10 ms and 10 s, further preferably between 50 ms and 3 s. During the diffusion annealing operation, at least the tin layer and the metal layer are heated, this being intended to mean in particular that at least these two layers are heated in such a manner that the mean temperature thereof lies in the region of the respectively desired temperature for the respective period of time.

The metallic substrate, in particular in the case where it is a wire, in particular a profiled or round wire, can be produced substantially from copper, a copper alloy, steel and/or aluminium. In particular, consideration is given to substrates, preferably wires, which have a core made of aluminium or steel which is cladded with copper or a copper alloy.

The present invention also provides a process for hardening a tin layer located on a substrate, in particular a profiled or round wire.

The process for hardening the tin layer, also called the hardening process hereinbelow, comprises the following steps:
depositing at least one metal layer made of at least one metal different to tin on the tin layer; and
carrying out a diffusion annealing operation encompassing at least the tin layer and the at least one metal layer.

With the process proposed, in an analogous manner to that already presented further above, it is possible to achieve particularly advantageous surface hardnesses and abrasion resistances for the resulting tin coating. For further advantages and advantageous effects, reference is made to the statements above.

In the hardening process proposed, it is possible that the tin layer has a thickness in the range of between 1 µm and 20 µm, preferably between 1 µm and 8 µm. In this case in particular the metal layer can have a thickness of 10 nm to 100 nm, preferably a thickness of 40 nm to 80 nm. As already mentioned, satisfactory and sufficient surface hardnesses and abrasion resistances can be achieved with the thicknesses indicated for the metal layer. In addition, reference is made to above statements, which apply here analogously.

In one configuration of the hardening process, it is provided that the metal of the metal layer is selected from the group consisting of cobalt, gold, nickel, platinum, silver, iron, rhodium, copper. For advantages and advantageous effects, reference is made to statements above. In particular with the proposed metals, in particular precious metals, it is possible to achieve a sufficient hardening of the tin coating for wires, in particular profiled or round wires, and an associated reduction in the abrasion in machining and processing machines.

In an analogous manner to that stated further above in connection with the process for tin coating, in the proposed hardening process the diffusion annealing operation can be carried out in such a manner that at least the tin layer and the metal layer are heated to a diffusion annealing temperature of between 100° C. and 500° C., preferably between 200° C. and 400° C. With respect to the heating of the respective layers or of the layer system, reference is made to the above statements and definitions, which correspondingly apply here.

In a manner corresponding to the process for tin coating, in the hardening process it can be provided that the tin layer and the metal layer are heated during the diffusion annealing operation for a period of time of between 10 ms and 1200 s, preferably between 10 ms and 10 s, further preferably between 50 ms and 3 s. Here, too, reference is made to the above statements.

The present invention is further directed to a metallic object in the form of a wire, in particular a profiled or round wire. The wire comprises a tin coating produced by a process for tin coating as described above, including all configurations of the process.

In a manner corresponding to the above statements, the tin coating of the metallic object has a particularly advantageous hardness and abrasion resistance. Tin coatings of this type are suitable particularly for wires which are generally fed to various machining and processing machines after they have been produced. The higher hardness and abrasion resistance achieved compared to pure tin coatings can lead, in terms of the wire, to improved corrosion protection and, in terms of the machining and processing machines, to reduced cleaning and therefore down times. In addition, in particular with respect to the achievable hardness, reference is made to the above statements.

Still further the present invention is directed to a wire, in particular a profiled wire or round wire, which comprises a substrate and a tin coating arranged downstream of the substrate. Arranged downstream in this context is intended to mean in particular that the tin coating can be deposited on the substrate itself or on an intermediate layer located on the substrate.

In the proposed wire, in a layer region remote from the substrate, the tin coating comprises metal particles of at least one metal different to tin, wherein the metal particles are in particular distributed heterogeneously and the concentration of the metal particles in the layer region increases in a direction running away from the substrate, in particular outwards.

In the proposed wire, the distribution of the metal particles is based on and results from a diffusion annealing operation of a layer system comprising a tin layer and at least one metal layer made of at least one metal different to tin. At least at its surface or in a layer region close to the surface, the proposed tin coating therefore comprises an, in particular heterogeneous, mixture of tin and metal particles of the metal achieved by diffusion annealing. A structure of this type has proved to be relatively hard and abrasion-resistant in particular compared to pure tin layers. With respect to the hardness, reference is made to above statements, which correspondingly apply here.

The layer region in which the metal particles of the metal are present extends from the outer surface in the direction of the substrate, preferably over 30% to 75% of the thickness of the entire tin coating. Such a distribution of the metal particles in particular in the outer region of the tin coating has proved to be sufficient for achieving the advantageous hardnesses and abrasion resistances which have already been mentioned.

In the wire, the metal of the metal particles can be selected from the following group: cobalt, gold, nickel, platinum, silver, iron, rhodium, copper. For details and advantages in relation to said metals, reference is made to above statements.

In the wire, the substrate can be produced substantially from copper, a copper alloy, from steel and/or from aluminium and alloys thereof. The substrate can also comprise a core made of steel or aluminium which is cladded with copper or a copper alloy.

As already mentioned in connection with the processes described further above, an intermediate layer made of nickel can be arranged between the substrate and the tin coating. For possible advantages, reference is made to the above statements.

BRIEF DESCRIPTION OF THE DRAWINGS

Hereinbelow, the invention will be described in more detail on the basis of exemplary embodiments.

DETAILED DESCRIPTION OF THE INVENTION

Figure 1:
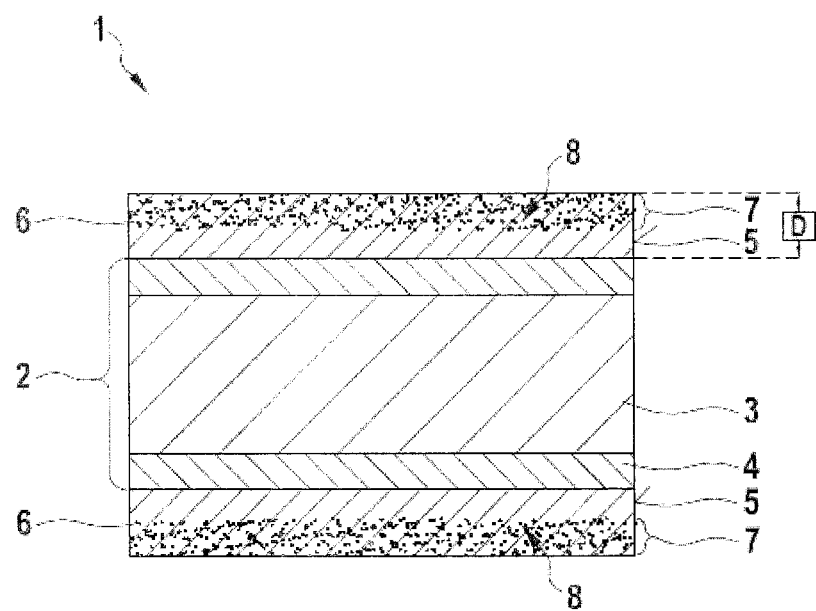
FIG. 1 shows a longitudinal section of a wire produced according to the invention.

FIG. 1 shows a longitudinal section of a wire 1 according to the invention. The wire 1 comprises a substrate 2. The substrate 2 in turn comprises a core 3, which can consist of copper or steel. The core 3 is surrounded or plated with a sheathing layer 4 made of copper or a copper alloy. Wires with such a structure are also known by the abbreviated designation copper cladded aluminium or copper cladded steel.

The wire 1 can also have a substrate 2 with a different structure. By way of example, the substrate 2 can consist of a material which is not cladded, for example copper, a copper alloy, steel, etc.

The wire 1 furthermore comprises a tin coating 5 arranged downstream of the substrate 2, in the present case of the sheathing layer 4. The tin coating 5 was produced by one of the processes described in more detail hereinbelow, the tin coating 5 comprising a base tin layer 6 which comprises metal particles 8 in a layer region 7 remote from the substrate 2.

In the illustration in FIG. 1, the metal particles 8 are indicated by shading, which at the same time indicates the concentration profile, described in even more detail further below, of the metal particles 8 in the tin base layer 6. The metal particles 8 are made of a metal different to tin, in particular of cobalt, gold, nickel, platinum, silver, iron, rhodium and/or copper.

The metal particles 8 are produced by diffusion annealing a layer composite consisting of a tin layer and a metal layer which is applied to the tin layer and is made of the metal of the metal particles.

In particular owing to the diffusion annealing operation, the metal particles 8 of the tin coating 5 are distributed heterogeneously, the concentration thereof decreasing from the outside inwards, i.e. towards the substrate 2. The metal particles 8 are present for instance in an outer layer region having a thickness of between 30% and 50% of the thickness D1 of the tin coating 5. Substantially no metal particles 8 are present in the underlying region.

The proposed wire 1 having the tin coating 5 containing the metal particles 8 in an outer layer region exhibits a higher hardness and abrasion resistance compared to pure tin coatings. In this respect, it is possible to provide effective corrosion protection. Furthermore, the tin abrasion arising at processing and machining machines can be reduced, which generally leads to shorter down times for cleaning and maintenance. With respect to the achievable hardness, reference is made to statements further above.

Figure 2:
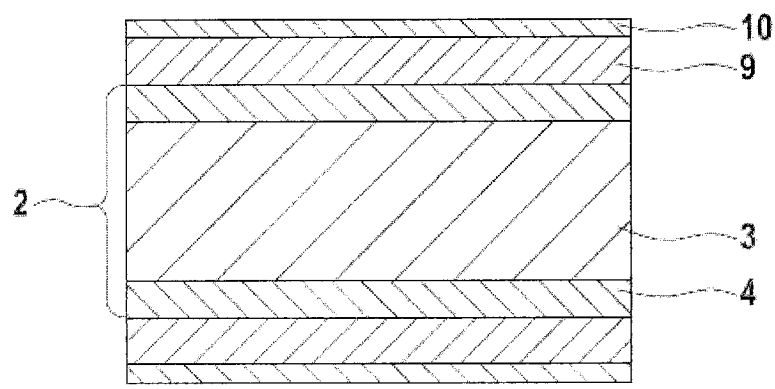
FIG. 2 shows a longitudinal section through the wire in an intermediate stage during the production thereof.

FIG. 2 shows a longitudinal section through the wire 1 in an intermediate stage during the production thereof. In terms of structure, the substrate 2 corresponds to that shown in FIG. 1. A tin layer 9 is deposited on the substrate 2. A metal layer 10 is deposited on the tin layer 9. As already mentioned, the metal layer 10 is produced from the metal different to tin.

By way of example, the tin layer 9 and the metal layer 10 can be deposited or applied by chemical or electrolytic processes. Here, the tin layer 9 can be deposited on the substrate 2 in a thickness of between 1 μm and 20 μm, preferably in a thickness of between 1 μm and 8 μm.

The metal layer 10 is preferably deposited in a thickness of between 10 nm and 100 nm, preferably in a thickness of between 40 nm and 80 nm. It should be noted that in the present case the thickness of a layer is to be understood as meaning in particular the mean layer thickness.

Said layer thicknesses have proved to be sufficient for the purposes pursued herein, in particular for improving the corrosion protection for the substrate 2.

In accordance with a variant which is not shown here, an intermediate layer made of nickel can also be present between the substrate 2 and the tin layer 9. By way of example, the nickel layer can be applied to the substrate 2 chemically or electrochemically before the tin layer 9 is deposited.

After the application, in particular the deposition, of all required layers, in particular of the tin layer 9 and of the metal layer 10, the wire 1 as per the configuration shown in FIG. 2 is subjected to a diffusion annealing operation. The diffusion annealing operation can be carried out either on a spooler, i.e. as a batch, or in a continuous pass, in particular following the coating with the metal layer.

The diffusion annealing operation is carried out in such a manner that at least the tin layer 9 and the metal layer 10 are heated to temperatures, in particular mean temperatures, of between 100° C. and 500° C., preferably of between 200° C. and 400° C.

During the diffusion annealing operation, metal particles 8 of the metal layer 10 located on the tin layer 9 diffuse into the tin layer 9, such as to give rise to the concentration of the metal particles 8 decreasing from the outside inwards, as described in more detail further above. Owing to this heterogeneous distribution of the metal particles 8, which may be in particular individual metal atoms, it is possible to achieve an improved hardness or an improved degree of hardness compared to in the case of pure tin layers in particular in the region of the outer surface. Owing to this improved hardness of the resulting tin coating 5, corrosion protection and abrasion resistance in particular can be improved.

For the diffusion annealing, the wire 1 can be heated to the respectively desired temperature, for example, for a period of time of between 10 ms and 1200 s. Depending on the application, heating times of between 50 ms and 3 s can also be used.

The process described above is substantially a process for producing the proposed wire. A process for hardening a tin layer on a metallic substrate 2, which is likewise to be attributed to the present invention, can readily be derived from this production process.

For hardening a tin layer which has already been deposited on a substrate, for example the substrate 2 of the wire 1, a metal layer can firstly be deposited, as described above, on the tin layer. Then, at least the two layers, i.e. the layer composite consisting of the tin layer and the metal layer, can be subjected to a diffusion annealing operation. After completion of the diffusion annealing operation, the tin coating formed from the tin layer and the metal layer has a greater hardness compared to the original tin layer.

Overall, it has been found that the object on which the invention is based is achieved by the processes proposed herein and the proposed wire. In particular, it is possible to provide a tin coating, in particular for wires, which is resistant to mechanical loading.

REFERENCE SIGNS

1 Wire
2 Substrate
3 Core
4 Cladding layer
5 Tin coating
6 Base tin layer
7 Layer region
8 Metal particles
9 Tin layer
10 Metal layer
D1 Thickness

What is claimed is:

1. A process for tin coating a metallic substrate having a top surface, comprising the following steps:
providing a two-layer coating on the top surface of the metallic substrate, wherein the two-layer coating comprises a tin layer formed on the top surface of the metallic substrate and a metal layer formed on the tin layer, wherein the tin layer has a bottom surface that defines a bottom surface of the two-layer coating, wherein the metal layer has a top surface that defines a top surface of the two-layer coating, wherein the metal layer is made of a metal material different from tin; and
carrying out a diffusion annealing operation on the two-layer coating to allow heterogeneous diffusion of the metal material into the tin layer in a direction from the top surface of the two-layer coating to the bottom surface of the two-layer coating, thereby creating a modified alloy layer having a top surface that is the same as the top surface of the two-layer coating and a bottom surface that is the same as the bottom surface of the two-layer coating;
wherein the concentration of the metal material decreases from the top surface of the modified alloy layer to the bottom surface of the modified alloy layer;
wherein the modified alloy layer has a thickness defined between the top surface of the modified alloy layer and the bottom surface of the modified alloy layer; and
wherein the metal material is present partially in the modified alloy layer, starting from the top surface of the modified alloy and extending only to 30%-50% of the thickness of the modified alloy layer; wherein the metallic substrate is a profiled or a round wire; and wherein an intermediate layer made of nickel is applied to the metallic substrate before the tin layer is applied, and wherein the diffusion annealing operation encompasses at least the tin layer and the metal layer.

2. The process according to claim 1, wherein the tin layer is deposited in a thickness of 1 μm to 20 μm.

3. The process according to claim 1, wherein the tin layer is deposited in a thickness between 1 μm and 8 μm.

4. The process according to claim 1, wherein the metal layer is deposited in a thickness of 10 nm to 100 nm.

5. The process according to claim 1, wherein the metal layer is deposited in a thickness, preferably between 40 nm and 80 nm.

6. The process according to claim 1, wherein the at least one metal of the metal layer is selected from the group consisting of cobalt, gold, nickel, platinum, silver, iron, rhodium and copper.

7. The process according to claim 1, wherein the diffusion annealing operation is carried out in such a manner that at least the tin layer and metal layer are heated to a diffusion annealing temperature of between 100° C. and 500° C.

8. The process according to claim 1, wherein the diffusion annealing operation is carried out in such a manner that at least the tin layer and metal layer are heated to a diffusion annealing temperature between 200° C. and 400° C.

9. The process according to claim 1, wherein at least the tin layer and the metal layer are heated during the diffusion annealing operation for a period of time of between 10 ms and 1200 s.

10. The process according to claim 1, wherein at least the tin layer and the metal layer are heated during the diffusion annealing operation for a period of time of between 10 ms and 10 s.

11. The process according to claim 1, wherein at least the tin layer and the metal layer are heated during the diffusion annealing operation for a period of time of between 50 ms and 3 s.

12. The process according to claim 1, wherein the substrate is produced substantially from copper, a copper alloy, steel and/or aluminium and combinations thereof.

13. A process for hardening a tin layer located on a metallic substrate having a top surface, comprising:
depositing a metal layer made of at least one metal different to tin on the tin layer to provide a two-layer coating on the top surface of the metallic substrate, wherein the tin layer has a bottom surface that defines a bottom surface of the two-layer coating, wherein the metal layer has a top surface that defines a top surface of the two-layer coating, wherein the metal layer is made of a metal material different from tin; and
carrying out a diffusion annealing operation on the two-layer coating to allow heterogeneous diffusion of the metal material into the tin layer in a direction from the top surface of the two-layer coating to the bottom surface of the two-layer coating, thereby creating a modified alloy layer having a top surface that is the same as the top surface of the two-layer coating and a bottom surface that is the same as the bottom surface of the two-layer coating;
wherein the concentration of the metal material decreases from the top surface of the modified alloy layer to the bottom surface of the modified alloy layer;
wherein the modified alloy layer has a thickness defined between the top surface of the modified alloy layer and the bottom surface of the modified alloy layer; and
wherein the metal material is present partially in the modified alloy layer, starting from the top surface of the modified alloy and extending only to 30% to 50% of the thickness of the modified alloy layer; wherein the metallic substrate is a profiled or a round wire; and wherein an intermediate layer made of nickel resides between the tin layer and the metallic substrate and wherein the diffusion annealing operation encompasses at least the tin layer and the metal layer.

14. The process according to claim 13, wherein the tin layer has a thickness in the range of between 1 µm and 20 µm, and wherein the metal layer is deposited in a thickness of 10 nm to 100 nm.

15. The process according to claim 13, wherein the tin layer has a thickness in the range of between 1 µm and 8 µm, and wherein the metal layer is deposited in a thickness of between 40 nm and 80 nm.

16. The process according to claim 13, wherein the metal of the metal layer is selected from the group consisting of cobalt, gold, nickel, platinum, silver, iron, rhodium and copper.

17. The process according to claim 13, wherein the diffusion annealing operation is carried out in such a manner that at least the tin layer and metal layer are heated to a diffusion annealing temperature of between 100° C. and 500° C.

18. The process according to claim 13, wherein the diffusion annealing operation is carried out in such a manner that at least the tin layer and metal layer are heated to a diffusion annealing temperature of between 200° C. and 400° C.

19. The process according to claim 13, wherein at least the tin layer and the metal layer are heated during the diffusion annealing operation for a period of time of between 10 ms and 1200 s.

20. The process according to claim 13, wherein at least the tin layer and the metal layer are heated during the diffusion annealing operation for a period of time of between 10 ms and 10 s.

21. The process according to claim 13, wherein at least the tin layer and the metal layer are heated during the diffusion annealing operation for a period of time of between 50 ms and 3 s.

* * * * *

UNITED STATES PATENT AND TRADEMARK OFFICE
CERTIFICATE OF CORRECTION

PATENT NO.       : 9,592,533 B2
APPLICATION NO.  : 14/017966
DATED            : March 14, 2017
INVENTOR(S)      : Ingo Jolk et al.

It is certified that error appears in the above-identified patent and that said Letters Patent is hereby corrected as shown below:

On the Title Page

Please insert:
--(30) Foreign Application Priority Data
September 5, 2012 (DE)..............................102012017520.5--

Signed and Sealed this
Twenty-third Day of May, 2017

Michelle K. Lee
*Director of the United States Patent and Trademark Office*